United States Patent Office 2,770,614
Patented Nov. 13, 1956

2,770,614

PROCESS FOR POLYMERIZING CRACKED FRACTIONS CONTAINING β METHYL STYRENE

Thomas Heaton Howarth, John Downing, and James Gordon Napier Drewitt, Spondon, near Derby, England, assignors to British Celanese Limited, a corporation of Great Britain No Drawing. Application May 25, 1951,
Serial No. 228,364

Claims priority, application Great Britain June 2, 1950

6 Claims. (Cl. 260—82)

This invention relates to polymers and especially to the formation of resinous polymers by the polymerisation of unsaturated cyclic hydrocarbons.

In this specification the term "unsaturated" means having a carbon-to-carbon double bond other than a bond of the kind present in a benzene ring; "mono-unsaturated" means having one such double-bond; and "di-unsaturated" means having two such double-bonds. Thus, e. g. styrene and indene are regarded as mono-unsaturated compounds and di-cyclo-pentadiene and the divinyl benzene as di-unsaturated.

It is known that resins can be formed from unsaturated cyclic hydrocarbons, e. g. indene, styrene, and methyl derivatives of these cyclic bodies, by polymerisation under the action of sulphuric acid. Resins are commonly formed in this way from coal-tar naphtha which contains several of such unsaturated cyclic substances in admixture. These resins tend to be darker in colour and lower in softening point than is desirable and much research has been directed to overcoming these disadvantages, which greatly reduce the commercial value of the resins. Many catalysts have been proposed instead of sulphuric acid. Among these are: various addition products of sulphuric acid, phosphoric acid, boron trichloride, antimony pentachloride, stannic chloride, aluminum chloride, ferric chloride, and ferric sulphate. All these substances appear to initiate the polymerisation by an ionic mechanism involving intermediate formation of a co-ordination compound between the monomer and the catalyst. Methods of polymerisation which appear to involve quite different mechanism, e. g., thermal polymerisation without a catalyst, and polymerisation initiated by peroxides, oxygen and other substances capable of leading to free-radical formation have also been proposed. It has further been proposed to effect polymerisation under pressure in the presence of electro-negative metals such as copper, silver, gold and platinum. Except in the case of styrene and certain methyl derivatives thereof, which are usually polymerised under the influence of peroxy compounds, none of these methods has proved altogether suitable, and sulphuric acid remains substantially the sole catalyst used in the production of resins by polymerisation of unsaturated cyclic substances in coal-tar naphtha.

Unsaturated cyclic resin-forming substances such as are referred to above are also contained in certain liquid residues obtained by cracking petroleum hydrocarbons. Complete analysis of these mixtures presents great difficulty, but fractional distillation followed by measurement of the bromine numbers, refractive indices and specific gravities of the various fractions, and calculation of the refractive intercepts of these fractions, gives valuable indications of their most important unsaturated constituents. Thus for example in a typical fraction of boiling range 130°–195° C. obtained by fractional distillation of a condensate from the cracking of petroleum we have identified styrene, beta-methyl styrene and indene among the unsaturated constituents. According to the conditions of cracking and fractionation, various di-unsaturated hydrocarbons, including dicyclo-pentadiene and divinyl compounds, may also be present as minor constituents. This invention is concerned primarily with the production of resins from hydrocarbon mixtures obtained by cracking petroleum (or in which all the unsaturated constituents can be so obtained) and in which none of the unsaturated constituents boils below 130° C. (and preferably none below 150° C.), at least 70% (preferably 95%) of the total weight of the unsaturated constituents consists of one or both of the substances beta-methyl styrene and indene, and said total weight does not contain as much as 5% of any di-unsaturated substance. Preferably the mixture has a bromine number (as defined below) between 50 and 100 and at least 70% distils between 150 and 180° C. at normal pressure. Of particular value as starting materials for the invention are fractions of bromine number between 60 and 95, in which under normal pressure not more than 5% distils below 150° C., at least 55% distils between 160 and 180° C. and at least 30% distils between 170 and 180° C.

In attempting to prepare resins from cracking residues of the kind referred to, great difficulty was experienced in obtaining pale resins of reasonably high softening point. Various substances were tried as catalysts. Sulphuric acid was soon discarded as giving neither of the properties particularly desired. Aluminium chloride, fed in powder form into the hydrocarbon mixture, was found to yield dark coloured products of low solubility in aromatic liquids. More promising results were obtained with aluminium chloride powder when the hydrocarbon fraction was first diluted with an equal volume of benzene. The products however, still showed more colour and a lower melting point than was desired.

It has now been found that substantial improvement both in colour and in melting point can be obtained by employing the aluminium chloride in solution in a molar excess of diethyl ether.

Further trials have indicated that aluminium chloride in the form of such solutions is generally applicable as a polymerisation catalyst for liquid, mono-unsaturated cyclic, resin-forming hydrocarbons, and is superior for this purpose to aluminium chloride in the absence of the excess of ether. The present invention therefore contemplates a process for the production of a synthetic resin by polymerising liquid mono-unsaturated, cyclic, resin-forming hydrocarbons by the action of aluminium chloride, wherein the aluminium chloride is applied in solution in a molar excess of diethyl ether and the temperature is kept between −10 and 30° C. during the polymerisation. As indicated above the process is of particular advantage when applied to liquid mixtures containing various unsaturated cyclic hydrocarbons such as are obtained by cracking petroleum hydrocarbons. The process is also of value when applied to other complex mixtures containing such hydrocarbons, e. g., coal-tar naphtha. Such mixtures may also contain unsaturated resin-forming cyclic ethers such as coumarone and alkyl derivatives thereof in addition to the unsaturated hydrocarbons. Benzenoid hydrocarbons free from aliphatic unsaturation, and aliphatic unsaturated hydrocarbons are also usually present in such mixtures. Excellent results can be obtained from starting products such that at least 60% of the hydrocarbon polymerised consists of beta-methyl styrene.

The following examples illustrate the invention.

EXAMPLE I

From a cracking process followed by fractionation a hydrocarbon mixture was obtained having the following characteristics:

| | |
|---|---|
| Bromine No. (as defined below) | 66.6 |
| Refractive index (n 20/D) | 1.5018 |
| Specific gravity at 15.5° C | 0.883 |

Engler distillation:

| Percent distilled— | °C. |
|---|---|
| 1 | 130 |
| 2 | 140 |
| 3 | 150 |
| 13 | 160 |
| 47 | 170 |
| 79 | 180 |
| 94 | 190 |
| 97 | 195 |

Twenty-five gallons of this fraction were charged to a stainless steel, brine-jacketed, stirred autoclave. The charge was cooled to 0° C. and 2.5 pounds (i. e., between 0.5 and 1.5% of the weight of the hydrocarbon fraction) of aluminium chloride in solution in diethyl ether was added in the course of 2¼ hours during which time the temperature was kept between 0 and 10° C. The molar ratio of ether to aluminium chloride was 6:1. After the addition the mixture was stirred for a further 5¾ hours at 10°–26° C.

To the reaction mixture was added 6 gallons of a 30% aqueous solution of caustic soda. The mixture was stirred for 2 hours at 26°–28° C. and then allowed to stand for 10 hours at room temperature. The aqueous layer was run off. The non-aqueous layer was mixed with 8 lbs. of activated fuller's earth and filtered. The ether and naphtha were distilled off in an enamelled still up to a base temperature of 190° C. at 15–20 mm. The resin was discharged while molten through a dip-pipe. The yield was 37% based on the weight of the original hydrocarbon fraction.

In the following table the properties of a resin ("A") prepared according to the example are compared with those of a resin ("B") made in the same way except that the hydrocarbon fraction was first diluted with an equal volume of benzene and the aluminium chloride was introduced in powder form instead of in solution in diethyl ether.

Table

| Property | Resin "A" | Resin "B" |
|---|---|---|
| Softening point °C | 110 to 113 | 80 to 85 |
| Bromine No | 14.1 | 9.1 |
| Ash content percent | 0.00 | 0.00 |
| Acid No | 0.00 | 0.00 |
| Colour (Lovibond): | | |
| Yellow | 1.1 | 2.7 |
| Red | 0.1 | 0.5 |
| Blue | 0.0 | 0.0 |
| Transmittancy of blue light percent | 70 | 55 |
| Infra red absorption (for key see below) at: | | |
| 3.3 mu | (c) | (c) |
| 3.45 mu | (d) | (d) |
| 5.80 mu | (c) | (0) |
| 6.20 mu | (b) | (b) |
| 6.70 mu | (c) | (c) |
| 6.85 mu | (c) | (c) |
| 7.70 mu | (c) | (0) |
| 9.70 mu | (a) | (a) |

In this table and throughout the specification: the softening points are those determined by the "ball and ring test" (Institute of Petroleum Handbook, 1944, p. 303); the "bromine number" is the weight of bromine absorbed per 100 grams of the substance under test in the modified McIlhiney method (Ib. p. 33); the "Acid number" is the weight in mgs. of caustic soda required to neutralise 1 gram of the sample; the colour is that determined by the Lovibond tintometer on a 5% (by weight) solutions of the resin in benzene, using 5 cm. cells; the transmittancy of blue light is that determined by the Hilger "Biochem" absorptiometer on a 5% (by weight) benzene solution of the resin in standard test-tubes. The symbols used in expressing the infra-red absorption have the following meanings: (0) means that the absorption is negligible; (a) to (d) are used to express progressively increasing absorptions.

It will be observed that the resin made according to the example is superior in respect of softening point, clarity and colour. The ash content of the resin whether prepared by the method of the example or by the alternative method described was less than 0.01%. A further slight improvement in the colour of the resin can be obtained by filtering the hydrocarbon fraction through activated fuller's earth before carrying out the polymerisation. The colour of the resin can be still further reduced if in distilling off the naphtha from the resin the temperature is not allowed to rise above 165° C. Further, as indicated above, it is of advantage for the hydrocarbon mixture to contain not more than 5% of constituents boiling below 150° C.

EXAMPLE II

The hydrocarbon mixture used had the following characteristics.

| | |
|---|---|
| Bromine No | 79.3 |
| Refractive index (n 20/D) | 1.5260 |
| Specific gravity (at 15.5° C.) | 0.900 |

Engler distillation:

| Percent distilled— | °C. |
|---|---|
| 4 | 150 |
| 5 | 160 |
| 9 | 170 |
| 61 | 180 |
| 86.5 | 190 |
| 94 | 200 |
| 96.5 | 210 |
| 97 | 220 |
| 98.5 | 225 |

The process was carried out as in Example I except that: the ethereal solution of aluminium chloride was added in four stages in the course of four hours after which reaction was continued for a further four hours, the temperature being held below 20° C. throughout; in distilling off the ether and naphtha the distillation was carried out at a pressure of 3.1 mm. and the base temperature was not allowed to rise above 162° C.

The properties of the resin were as follows:

| | |
|---|---|
| Softening point, °C | 120 |
| Ash content, percent | 0.022 |
| Acid No | 0.00 |
| Colour (Lovibond): | |
| Yellow | 0.5 |
| Red | 0.1 |
| Blue | 0.0 |
| Transmittancy of blue light, percent | 83 |

EXAMPLE III

The process was carried out as in Example II except that the naphtha was distilled off under a pressure of 12 mm. to a base temperature of 160° C.

The properties of the resin were as follows:

| | |
|---|---|
| Softening point, °C | 123 |
| Ash content | 0.031 |
| Acid No | 0.00 |
| Colour (Lovibond): | |
| Yellow | 0.4 |
| Red | 0.0 |
| Blue | 0.0 |
| Transmittancy to blue light, percent | 84 |

Useful results can also be obtained when the hydrocarbon treated comprises a fraction such as those specified in the examples, diluted with up to an equal volume of liquid saturated hydrocarbons e. g. benzene.

Fractions of the composition specified in Examples II and III were also treated in the way described for the preparation of "Resin B" above, i. e., adding the aluminium chloride in powder form after dilution with benzene, and with no ether present. The resins obtained were in every case inferior to that of Example I and much inferior to those of Examples II and III, in softening point, colour and transparency. In an attempt to find alternatives to diethyl ether trials were made according to Example III using (a) ethyl acetate, (b) acetone, and (c) di-isopropyl ether instead of diethyl ether. In all cases the yield of resin was lower and the resin was darker and of lower transmittancy. Moreover with di-isopropyl ether difficulty was found in dissolving the aluminium, and the ether caused undesirable emulsification in the caustic soda treatment of the resin. Attempts to use, instead of the ether solution of aluminium chloride, acetic acid solutions of boron trifluoride, which it was thought might behave similarly, also failed. The polymerisation has been described as carried out at a temperature ranging from 0° C.–26° C. Some variation from this range is permissible, but if the temperature be allowed to rise unduly products inferior in colour and/or in melting point may be obtained, and it is preferred to keep the temperature below 30° C. By working at temperatures ranging from −10° to 0° C. we have obtained greenish yellow resins of somewhat higher softening point in lower yield. Thus, for example, a typical trial within this temperature range gave 25% based on the weight of the hydrocarbon fraction of a resin of softening point 125° C.

We have obtained the best results by using solutions of aluminium chloride in which the molar ratio of ether to aluminium chloride was about 6:1, e. g. between 5:1 and 7:1. It is not, however, essential in order to obtain useful results to work with solutions in which the molar ratio is within this range. In general the activity of the catalyst diminishes as the proportion of ether increases. Thus, at the sacrifice of some activity in the catalyst, the molar ratio of ether to aluminium chloride can be increased, e. g. up to 10:1 or even higher. On the other hand, the molar ratio can be decreased, e. g. to 3:1 but we have found such concentrated solutions more difficult to work with. The solutions used appear to be solutions of an aluminium chloride-ether complex in ether.

Having described our invention, what we desire to secure by Letters Patent is:

1. Process for the production of a synthetic resin, which comprises effecting polymerization in a mixture of hydrocarbons containing unsaturated constituents none of which boils below 130° C., at least 70% of the total weight of the unsaturated constituents consisting of a substance selected from the class consisting of beta-methyl styrene and indene, and said total weight not containing as much as 5% of any di-unsaturated substance, the polymerization being effected by the action of aluminum chloride in solution in a molar excess of diethyl ether at a temperature of −10 to +30° C.

2. Process for the production of a synthetic resin which comprises effecting polymerization in a mixture of hydrocarbons containing unsaturated constituents none of which boils below 150° C., at least 95% of the total weight of the unsaturated constituents consisting of a substance selected from the class consisting of beta-methyl styrene and indene, and said total weight not containing as much as 5% of any di-unsaturated substance, the polymerization being effected by the action of aluminum chloride in solution in a molar excess of diethyl ether at a temperature of −10 to +30° C.

3. Process for the production of a synthetic resin which comprises effecting polymerization in a mixture of hydrocarbons containing unsaturated constituents none of which boils below 130° C., at least 70% of the total weight of the unsaturated constituents consisting of a substance selected from the class consisting of beta-methyl styrene and indene, and said total weight not containing as much as 5% of any di-unsaturated substance, the polymerization being effected by the action of aluminum chloride in solution in a molar excess of diethyl ether at a temperature of −10 to +30° C., the molar ratio of diethyl ether to aluminum chloride being between 5:1 and 7:1 and the proportion of aluminum chloride to hydrocarbon being from 0.5 to 1:5% by weight.

4. Process for the production of a synthetic resin which comprises effecting polymerization in a mixture of hydrocarbons containing unsaturated constituents none of which boils below 150° C., at least 95% of the total weight of the unsaturated constituents consisting of a substance selected from the class consisting of beta-methyl styrene and indene, and said total weight not containing as much as 5% of any di-unsaturated substance, the polymerization being effected by the action of aluminum chloride in solution in a molar excess of diethyl ether at a temperature of −10 to +30° C., the molar ratio of diethyl ether to aluminum chloride being between 5:1 and 7:1 and the proportion of aluminum chloride to hydrocarbon being from 0.5 to 1.5% by weight.

5. Process for the production of a synthetic resin, which comprises effecting polymerization in a mixture of hydrocarbons, said mixture being a petroleum crackate fraction having a bromine number between 50 and 100 and being of such a composition that at least 70% distils between 150 and 180° C. at normal pressure, none of the unsaturated constituents boils below 130° C., at least 70% of the total weight of the unsaturated constituents consists of a substance selected from the class consisting of beta-methyl styrene and indene and said total weight does not contain as much as 5% of any di-unsaturated substance, the polymerization being effected by treatment with 0.5–1.5% of aluminum chloride based on the weight of hydrocarbon, said aluminum chloride being dissolved in 5–7 molar proportions of diethyl ether.

6. Process for the production of a synthetic resin, which comprises effecting polymerization in a mixture of hydrocarbons, said mixture being a petroleum crackate fraction having a bromine number between 60 and 95 and being of such composition that when fractionally distilled under normal pressure not more than 5% distils below 150° C., at least 55% distils between 160 and 180° C., and at least 30% distils between 170 and 180° C., none of the unsaturated constituents boiling below 130° C., at least 70% of the total weight of the unsaturated constituents consisting of a substance selected from the class consisting of beta-methyl styrene and indene and said total weight not containing as much as 5% of any di-unsaturated substance, the polymerization being effected by treatment with 0.5–1.5% of aluminum chloride based on the weight of hydrocarbon, said aluminum chloride being dissolved in 5–7 molar proportions of diethyl ether.

References Cited in the file of this patent

UNITED STATES PATENTS

| | | |
|---|---|---|
| 1,982,708 | Thomas | Dec. 4, 1934 |
| 2,383,084 | Rummelsburg | Aug. 21, 1945 |
| 2,559,062 | Dornte | July 3, 1951 |
| 2,565,222 | Geiger | Aug. 21, 1951 |
| 2,582,425 | Geiser | Jan. 15, 1952 |

FOREIGN PATENTS

| | | |
|---|---|---|
| 743,302 | France | Jan. 6, 1933 |

OTHER REFERENCES

Ellis: "Chemistry of Synthetic Resins," vol. I, pages 258, 259, Reinhold (1935).